US007908075B2

(12) United States Patent
Qi et al.

(10) Patent No.: US 7,908,075 B2
(45) Date of Patent: Mar. 15, 2011

(54) TRAFFIC INFORMATION QUERY SYSTEM AND TRAFFIC INFORMATION QUERY METHOD

(75) Inventors: Hongwei Qi, Beijing (CN); Yuguang Liu, Beijing (CN); Yabo Wang, Beijing (CN); Xiaowei Liu, Beijing (CN); Huifeng Liu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 1156 days.

(21) Appl. No.: 11/598,725

(22) Filed: Nov. 14, 2006

(65) Prior Publication Data
US 2007/0118564 A1 May 24, 2007

(30) Foreign Application Priority Data

Nov. 15, 2005 (CN) .......................... 2005 1 0125303

(51) Int. Cl.
*G08G 1/09* (2006.01)
*G01C 21/00* (2006.01)
*G06F 17/00* (2006.01)
(52) U.S. Cl. ...................... 701/117; 701/120; 707/104.1; 340/995.13
(58) Field of Classification Search .................. 701/117, 701/120, 209, 210, 211; 707/3, 104.1; 340/995.13; 455/414.3
See application file for complete search history.

(56) References Cited

U.S. PATENT DOCUMENTS

| 6,826,472 | B1 * | 11/2004 | Kamei et al. ................... 701/202 |
| 6,965,574 | B1 * | 11/2005 | Cook et al. ..................... 370/252 |
| 7,062,379 | B2 * | 6/2006 | Videtich ........................ 701/210 |
| 7,072,676 | B1 * | 7/2006 | Hessing et al. ................ 455/466 |
| 2003/0204587 | A1 * | 10/2003 | Billhartz ........................ 709/224 |
| 2004/0225433 | A1 * | 11/2004 | Burt ............................ 701/200 |
| 2005/0080552 | A1 | 4/2005 | Feldman et al. |

FOREIGN PATENT DOCUMENTS

| EP | 1503355 A1 | 2/2005 |
| JP | 2001-208559 A | 8/2001 |
| JP | 2002-521774 A | 7/2002 |

OTHER PUBLICATIONS

Chinese Office Action dated Jul. 24, 2009, issued in Chinese Patent Application No. 200510125303.7, English language Translation.

* cited by examiner

*Primary Examiner* — Tan Q Nguyen
(74) *Attorney, Agent, or Firm* — Sughrue Mion, PLLC

(57) ABSTRACT

The invention provides a map knowledge base generating device and a method thereof, and a traffic information query system and a method thereof. The traffic information query system, comprises: a map knowledge base generating section for generating knowledge related to attributes of roads and traffic points, attribute values corresponding to the attributes, and spatial information of the attribute values based on an electronic map so as to form a map knowledge base; and a traffic query processing section for receiving and analyzing a query form a user terminal, decomposing the query if it is determined that the query can be decomposed according to the map knowledge base, and searching a traffic information database according to the decomposed the query request.

32 Claims, 9 Drawing Sheets

```
Map Knowledge Base
{
    // Concept
    Road Name: Second Ring, ...
    Segment:   West Second Ring, ...
    Bridge:    Xizhimen Bridge, Guanyuan Bridge, Fuchengmen Bridge, Fuxingmeng
Bridge ...
    Roadside landmark buildings:   Guanyuan Park...
    Intersection: ...
    Direction:   South, North, North-South, ...
    ...

// Relation
    Segment-of(x, y):      (West Second Ring, Second Ring)
    Point-of(x1, x2... y):    (Xizhimen Bridge, Guanyuan Bridge, Fuchengmen Bridge,
Fuxingmeng Bridge, West Second Ring)
    Direction-of(x1, x2...y):  (North, South, North-South, West Second Ring)
    On-roadside landmark buildings(x, y): (Guanyuan Park, West Second
Ring)...
    ...

// Axiom
    ∀x, y, z: Point-of(x, z) & Point-of(y, z) → Segment-of([x, y], z)
    ∀x, y, z: Segment-of(x, y) & Point-of(z, x) → Point-of(z, y)
}
```

Fig. 3

| ID | Road Name | Jam Point | Direction | Traffic Status | Time |
|---|---|---|---|---|---|
| 1 | West Second Ring | Xizhimen Bridge | North | Slow | 9:59 |
| 2 | West Second Ring | Guanyuan Bridge | North | Slow | 9:59 |
| 3 | West Second Ring | Fuchengmen Bridge | North | Slow | 9:59 |
| 4 | West Second Ring | Fuxingmen Bridge | North | Slow | 9:59 |
| 5 | West Second Ring | Guanyuan Park | North | Slow | 9:59 |

Fig. 6a

| Traffic Status |
|---|
| Jammed |
| Slow |
| Accident |
| Normal |
| Fast |
| ... |

Fig. 6b

TRAFFIC INFORMATION QUERY SYSTEM AND TRAFFIC INFORMATION QUERY METHOD

FIELD OF THE INVENTION

This invention relates to the technical field of processing traffic query information, more specifically, to a map knowledge base generating device and a method thereof, a traffic information query system, and a traffic information query method.

BACKGROUND OF THE INVENTION

Despite of the continuous investment in road construction in massive amounts of financial and human resources, the fast increasing numbers of vehicles still brings about the overload of the mad capability and causes traffic jams. In fact, road congestion is a persistent major factor in many cities. So it is needed to give proper attention to and take into account of providing traffic information to a driver in time. Therefore, the driver can efficiently schedule the travel route to the destination. So it is very necessary to provide real-time/history traffic information to a driver The US patent application No. 20050080552 A1, titled as "method and system for modeling and processing vehicular traffic data and information and applying thereof", focuses on route recommendation and navigation system and a method thereof.

The EP patent application No. 1503355, titled as "A device, system and a method for processing statistic traffic information", focuses on a system of traffic status prediction based on historical traffic information and a method thereof.

The existing prior art tends to provide traffic information service just based on traffic sensor/mobile sensor information etc. In fact, if only these kinds of information, it is not enough. For example, because large expenditures is necessary for the infrastructure and maintenance, lots of cities just set sensors on major roads. However, in fact, users need not only traffic information about the major roads, but also traffic information about the minor roads.

Traditional traffic information providing method includes broadcasting traffic information, overlapping traffic information on a map and displaying the information. But a user could not get the traffic information that he requires timely based on the broadcasting. And the acquired traffic information is not accurate enough. Additional devices are needed when the traffic information is overlapped on the map, such as GPS

SUMMARY OF THE INVENTION

The invention is made to address the above problems. This invention relates to a map knowledge base generating device and a method thereof, a traffic information query system and a method thereof. So a user terminal can be used to query traffic information conveniently and accurately as well as query traffic information timely without an additional device. Thus the cost is reduced.

According to the first aspect of this invention, a map knowledge base generating section comprises:
an attribute value extracting unit for extracting attribute values corresponding to attributes of the roads and traffic points from an electronic map;
attribute value spatial relationship forming unit for forming spatial correspondence relationship among attribute values of the roads and traffic points; and
a combining unit for combining attributes of roads and traffic points and attribute values corresponding to the attributes, spatial correspondence relationship among the attribute values and axiom based on the spatial correspondence relationship so as to form a map knowledge base.

According to the second aspect of this invention, a map knowledge base generating method is provided, comprising:
an attribute value extracting step of extracting attribute values corresponding to attributes of the roads and traffic points from the electronic map;
attribute value spatial relationship forming step of forming spatial correspondence relationship among attribute values of the roads and traffic points; and
a combining step of combining attributes of roads and traffic points and attribute values corresponding to the attributes, spatial correspondence relationship among the attribute values and axiom based on the spatial correspondence relationship so as to form a map knowledge base.

According to the third aspect of this invention, a traffic information query system is provided, comprising:
a map knowledge base generating section for generating knowledge related to attributes of roads and traffic points, attribute values corresponding to the attributes, and spatial information of the attribute values based on an electronic map so as to form a map knowledge base; and
a traffic query processing section for receiving and analyzing a query form a user terminal, decomposing the query if it is determined that the query can be composed according to the map knowledge base, and searching a traffic information database according to the decomposed query.

According to the forth aspect of this invention, a traffic information query method is provided, comprising:
a map knowledge base generating step of generating knowledge related to attributes of roads and traffic points, attribute values corresponding to the attributes, and spatial information of the attribute values based on an electronic map so as to form a map knowledge base; and
a traffic query processing step of receiving and analyzing a query from a user terminal, decomposing the query if it is determined that the query can be decomposed according to the map knowledge base.

According to the fifth aspect of this invention, a traffic information query device is provided, comprising:
a receiving section for receiving the query from a user terminal as a first query;
an analyzing section for identifying the format of the first query, decomposing the first query into a second query which corresponds to the attribute values of roads or traffic points when the analyzing section determines the first query can be decomposed according to the map knowledge base, wherein the map knowledge base comprises knowledge related to attributes of roads and traffic points, attribute values corresponding to the attributes, and spatial information among the attribute values based on an electronic map;
a query section for searching a traffic information database for traffic information according to the first query or the second query and forming a query result; and
a sending section for sending the query result to the user terminal.

According to the sixth aspect of this invention, a traffic information query method is provided, comprising:
a receiving step of receiving the query from a user terminal as a first query;
an analyzing step of identifying the format of the first query, decomposing the first query into a second query which corresponds to the attribute values of roads or traffic points when the first query can be decomposed according to the map knowledge base, wherein the map knowledge base comprises information related to attributes of roads and traffic points, attribute values corresponding to the attributes, and spatial information of the attribute values based on an electronic map;

a searching step of searching a traffic information base for traffic information according to the first query and the second query and forming a query result; and a sending step of sending the query result to the user terminal.

BRIEF DESCRIPTION OF THE DRAWINGS

FIG. 3 shows a schematic block of a part of a map knowledge base according to the invention.

FIG. 6a shows an example of a traffic information database used by the traffic information query system.

FIG. 6b shows an example of a traffic status description table.

DETAILED DESCRIPTION OF THE PREFERRED EMBODIMENTS

Figure 1:
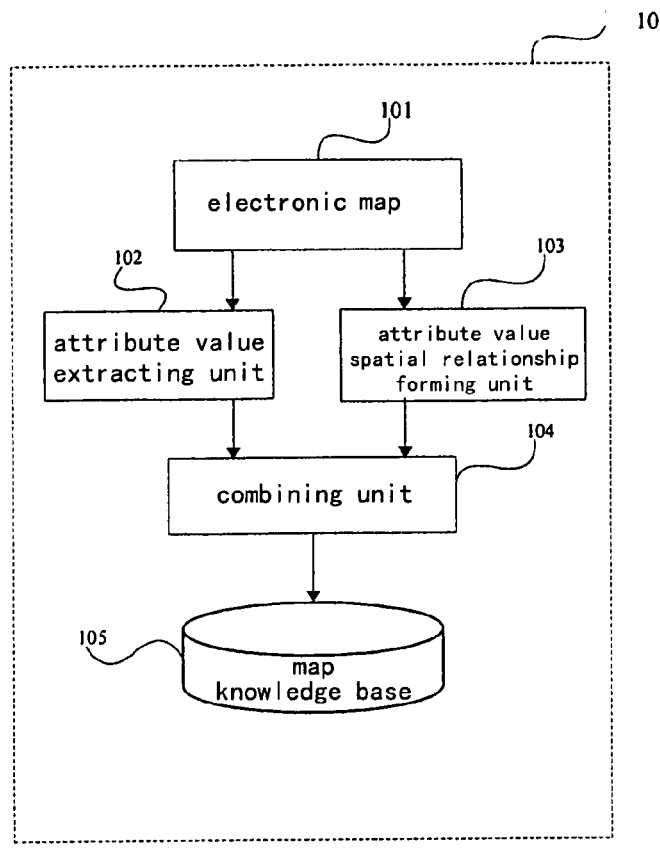
FIG. 1 shows a schematic block of a map knowledge base generating device according to the invention.

Hereinafter, the preferred embodiment will be illustrated with reference to the attached drawings. In the drawings, same elements are illustrated by the same symbols or numbers. Moreover, in the following description of the present invention, a detailed description of known functions and configurations incorporated herein will be omitted in order not to make the subject matter of the present invention unclear.

FIG. 1 shows a schematic block of a map knowledge base generating device 10 according to this invention. The map knowledge base generating device 10 includes an attribute value extracting unit 102, an attribute value spatial relationship forming unit 103, a combining unit 104, a map knowledge base 105 and an electronic map 101.

The map knowledge base generating device 10 is used for inputting information such as space relation of attribute value among roads and traffic points in electronic map 101 into the map knowledge base 105, therefore, knowledge about spatial information among attribute values of roads and traffic points will be learned from the electronic map.

Figure 2:
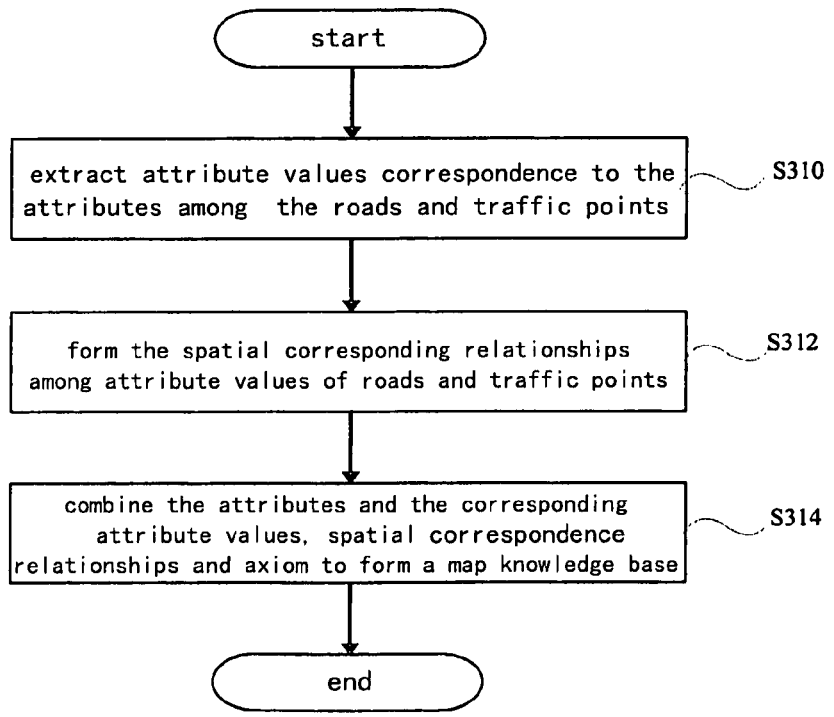
FIG. 2 shows a flow chart of generating a map knowledge base according to the invention.

FIG. 2 shows a flow chart of generating a map knowledge base by a map knowledge base generating device. First, the structure of the map knowledge base 105 will be illustrated with reference to FIG. 3. As shown in FIG. 3, the map knowledge base includes three parts: concept part, relation part and axiom part.

(1) Concept part comprises various attributes among roads and traffic points in the electronic map, which is represented as (Attribute: Attribute Value 1, Attribute Value 2, . . . ). The types of attributes include two different kinds. One is a type of roads and traffic points, and specifically, it includes road names, road segments, bridges, intersection and roadside landmark buildings, etc., for example (road name: the second ring, . . . ). The second is the property of the roads and traffic points, and specifically, it includes directions, etc., for example (direction: North bound, South bound, North-South bound . . . ) as FIG. 3 shows.

(2) Relation part is used to define the space relationship of attribute values corresponding to attributes among roads and traffic points in the concept part, such as "segment-of (x, y)" helps describe that a road segment x is a part of a road y. For example, the West second ring is a part of the second ring, "point-of(x1, x2, . . . , y)" is used to describe some traffic points x1, x2, . . . are points on a road y, such as the Xizhimen bridge, the Guanyuan bridge, the Fuchengmen bridge, the Fuxingmen bridge are points on the second ring. Furthermore, "direction-of (x1, x2, . . . , y)" is used to describe a road or traffic point y includes direction x1, x2, . . . etc., such as "the Xizhimen bridge" has three directions: north bound, south bound and north-south bound. The function of the relation part is to deduce space relationship of attribute values among the roads and traffic points, for example, it deduces that the Xizhimen bridge, the Guanyuan bridge, the Fuchengmen bridge, the Fuxingmen bridge are points on the second ring, according to point-of(the Xizhimen bridge, the Guanyuan bridge, the Fuchengmen bridge, the Fuxingmen bridge, the West second ring).

(3) Axiom part includes theorems on which further deductions can be performed. Axiom is formed based on the relation part, such as $\forall$x, y, z: Segment-of(x, y) & point-of(z, x)→point-of(z, y). If West second ring road is one segment of the second ring road, and the Xizhimen bridge is a point of the West second ring road, then it can be deduced that the Xizhimen bridge is also a point of the second ring road. The amounts of theorems in the axiom part are limited and they can be extended as required. FIG. 3 only shows two examples. Usually, axiom part is organized and determined manually.

The map knowledge base generating device 10 is used to input information such as spatial relation among attribute values of roads and traffic points in electronic map 101 into the map knowledge base 105. The map knowledge base generating device 10 is mainly based the functions provided by the GIS (Geographical Information System) platform. These functions are commonly used for those skilled in the art. The representative GIS platform includes MapInfo, ArcInfo, and SuperMap.

The procedure that the map knowledge base generating device 10 generates the map knowledge base 105 as shown in FIG. 3 will be illustrated in detail with reference to FIG. 2.

Referencing to FIG. 2, the attribute value extracting unit 102 extracts attribute values corresponding to the attributes among each of the roads and traffic points in the electronic map 101 by using GIS function at S210. Therefore, the concept part is constructed by attributes and their corresponding attribute values among roads and traffic points. Namely, the attribute values corresponding to attributes comprising such as road names, road segment, bridge, intersection and roadside landmark buildings, are extracted. It obtains the attributes (bridge: the Xizhimen bridge, the Guanyuan bridge, the Fuchengmen bridge, the Fuxingmen bridge . . . ) with respect to attribute "bridge". The traffic points are points related to traffic information on a mad, more specifically, they may comprise bridge, road segments, intersection, and roadside landmark buildings, etc. That is to say, the traffic points include nodes on a road (such as bridge, road segments, intersection, etc.) and roadside points near to the road (such as roadside landmark buildings, etc.). So the traffic points comprise specific points on the map, which can not be decomposed further.

At S212, the attribute value spatial relationship forming unit 103 fills in the spatial corresponding relation among attribute values of roads and traffic points by using GIS function, thereby the relation part of the map knowledge base is formed, for example, for relation "point-0f (x1, x2, ..., y)", the corresponding function in SuperMap is "soDatasetVector.QueryEx(objGeometry As soGemometry, scsCommonPoint,") as soRecordset". It is used to query how many points (bridges) are on a road. It can be obtained from the above function "point-of (the Xizhimen bridge, the Guanyuan bridge, the Fuchengmen bridge, the Fuxingmen bridge, the West second ring)". It means "the Xizhimen bridge", "the Guanyuan bridge", "the Fuchengmen bridge" and "the Fuxingmen bridge" are the points (bridges) on the West second ring.

Figure 4:
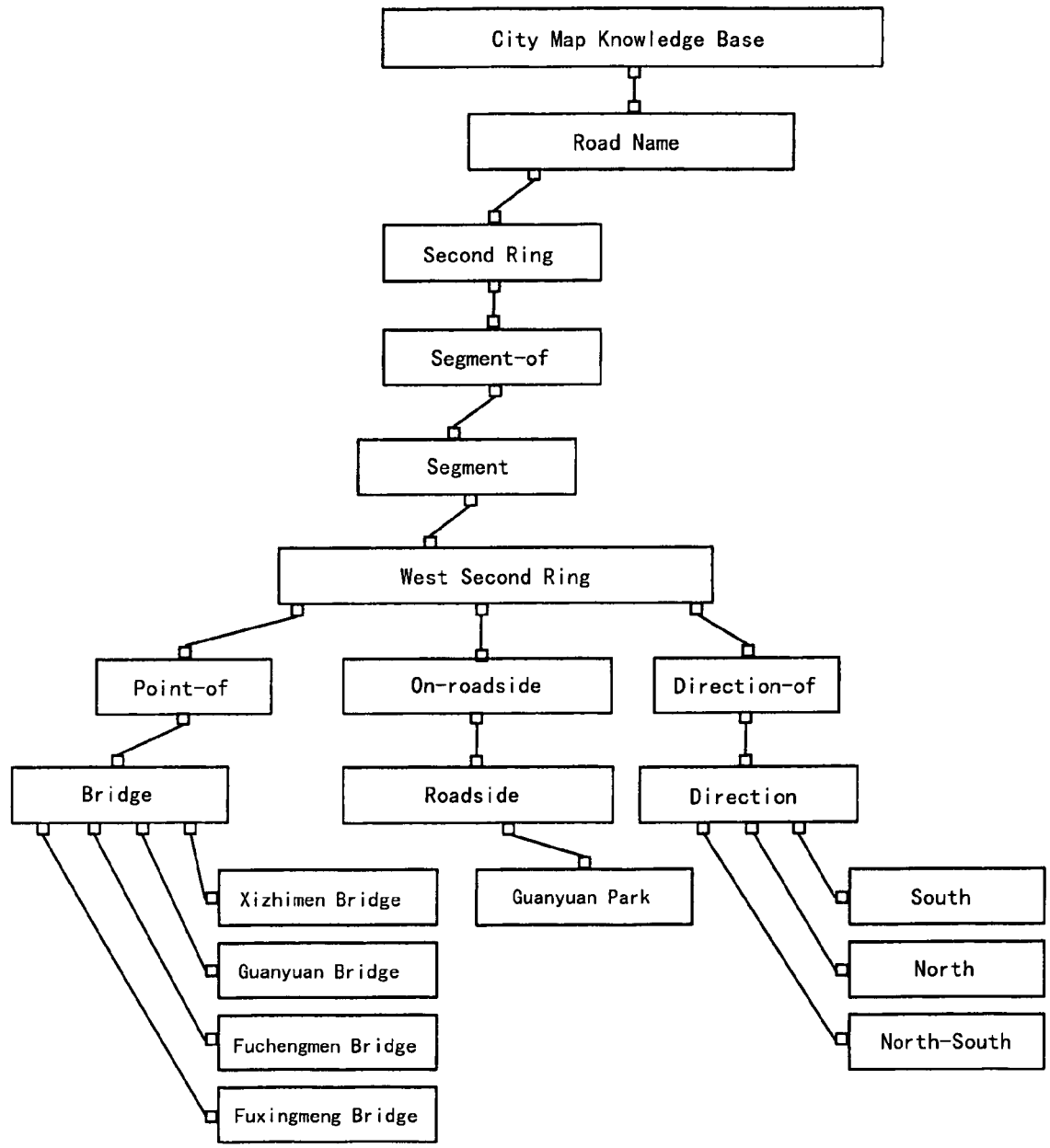
FIG. 4 shows a schematic block of a map structure corresponding to the map knowledge base.

At S214, the combining unit 104 combines the attribute values corresponding to attributes among roads and traffic points and the attributes, filled spatial relationship among attribute values of roads and traffic points and axiom part base on relation part, so as to form the map knowledge base 105 as shown in FIG. 4. The map knowledge base 105 is used for providing spatial information among attribute values of roads and traffic points that is processed in deep-level. FIG. 4 shows a map structure corresponding to the map knowledge base. The map knowledge base is converted to the map structure shown as FIG. 4 and is stored into the memory of a computer. The conversion method comprise:

(1) Take attribute names and attribute values in the concept part and relation names in the relation part as nodes (such as shown in the rectangle block) (2) Takes the associations among the attributes and attribute values in the concept part, the dependence relation of attributes values of roads and traffic points in relation part as sides (such as the side which connects the two rectangle blocks).

Figure 5:
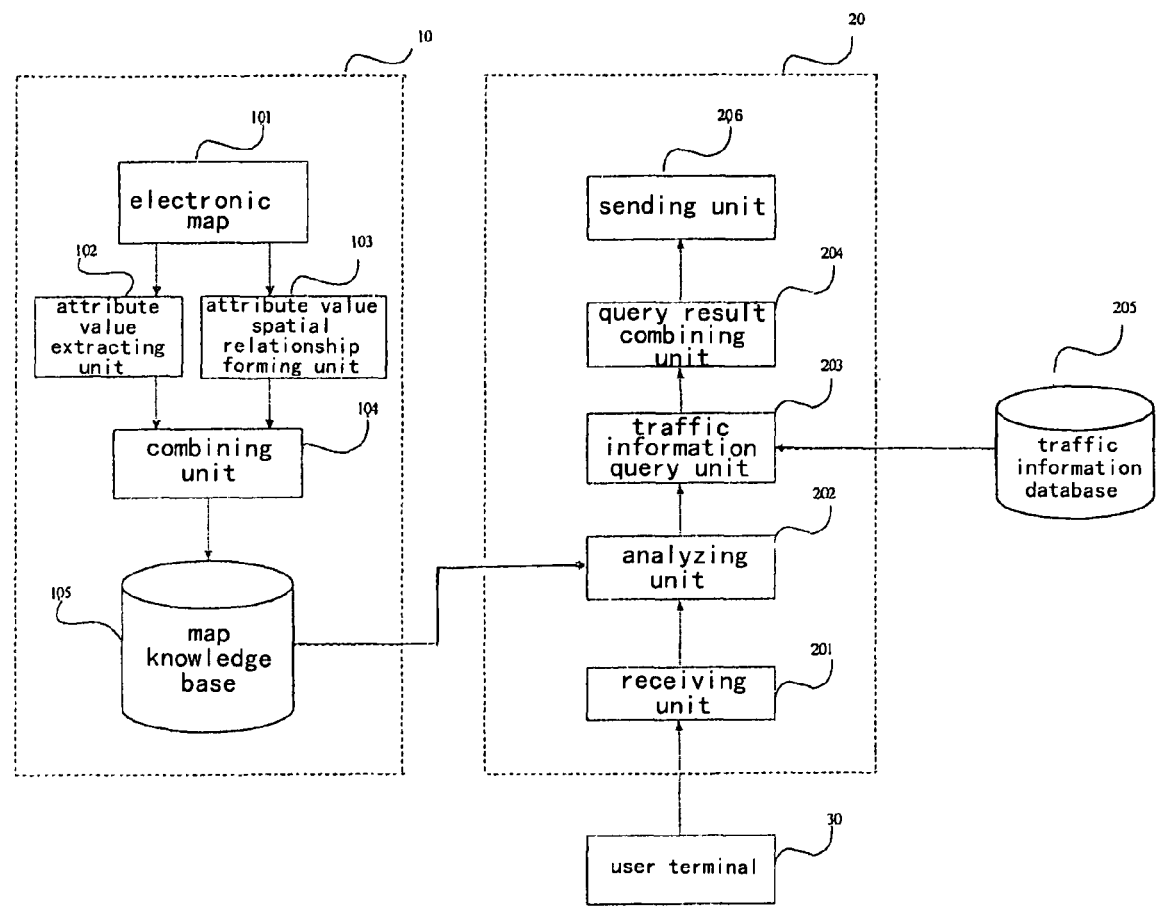
FIG. 5 shows a schematic block of a traffic information query system according to the invention.

There are a lot of method are used to obtain the deduction based on the map structure shown in FIG. 5. Reference can be made to Proposed design for gR, a graphical models toolkit for R, Kevin P. Murphy, 2003, which can be get from the following websites: http://www.cs.ubc.ca/~murphyk/Software/BNT/gr03.pdf. Moreover, if necessary, some deduction will be performed by using the theorems in axiom part shown in FIG. 3. Those theorems are established on the basis of FIG. 4. The deduction function is known for those skilled in the art.

FIG. 5 shows a traffic information query system by using the map knowledge base generating device 10 shown in FIG. 1. The traffic information query system comprises the map knowledge base generating device 10, a traffic information database 205, a traffic query processing device 20 and a memory unit for storing traffic status description table describing traffic status (not shown). The traffic query processing device 20 including a receiving unit 201 and a analyzing unit 202, a traffic information query unit 203, a query result combining unit 204 and a sending unit 206. A user terminal 30 connects to the traffic information query system via communication network(not shown), the user terminal 30 is various kind of wireless or wired communication device, including but not limited to mobile phone, PDA(person digital assistant), computer and so on. When the traffic query processing device 20 receives a query request sent form the user terminal 30 via communication network, the traffic query processing device 20 processes the received query request according to the map knowledge base 105 which is generated by the map knowledge base generating device 10, and searches traffic information from the traffic information database 205 according the processed result of the query request, and then sends the result of query to the user terminal 30 via communication network. Thereby the user terminal conveniently and timely receives traffic information which is required by using the traffic information query system.

The following will specifically describes the traffic information query system according to this invention. First of all, the traffic information database 205 and the traffic status description table which is used by the traffic information query system will be described. FIG. 6a shows an example of a traffic information database, wherein the traffic information database is, for example, composed of traffic sensors or traffic information which is collected by mobile monitors, it stores related traffic information of attribute values among roads and traffic points, the traffic points are points related to traffic on a road, which specifically comprises a bridge, a road segment, a intersection, a roadside landmark buildings, and so on. That is to say, the traffic points include nodes on a mad (such as a bridge, a road segment and a intersection) and roadside points near to the road (such as a roadside landmark buildings). So the traffic points include specific points on the map which cannot be decomposed further. Referring to FIG. 6a, the traffic information database comprises data item such as a road name, a traffic point, a direction, a traffic status and time. FIG. 6b shows an example of a traffic status description table. According to FIG. 6b, the traffic status description table includes a traffic jam, traffic slow, an accident, normal, fast, etc. The traffic status description table is used to provide matching information for query and analysis into the traffic information query system.

By using the traffic information database 205 and the map knowledge base 105 which is generated by the map knowledge base device 10, the traffic query processing device 20 analyzes and processes users query request, then obtains the traffic information which are requested by the user through searching the traffic information database 205. The flow chart of the query process performed by the traffic information query system will be described in conjunction with FIGS. 7 and 8.

Figure 7:
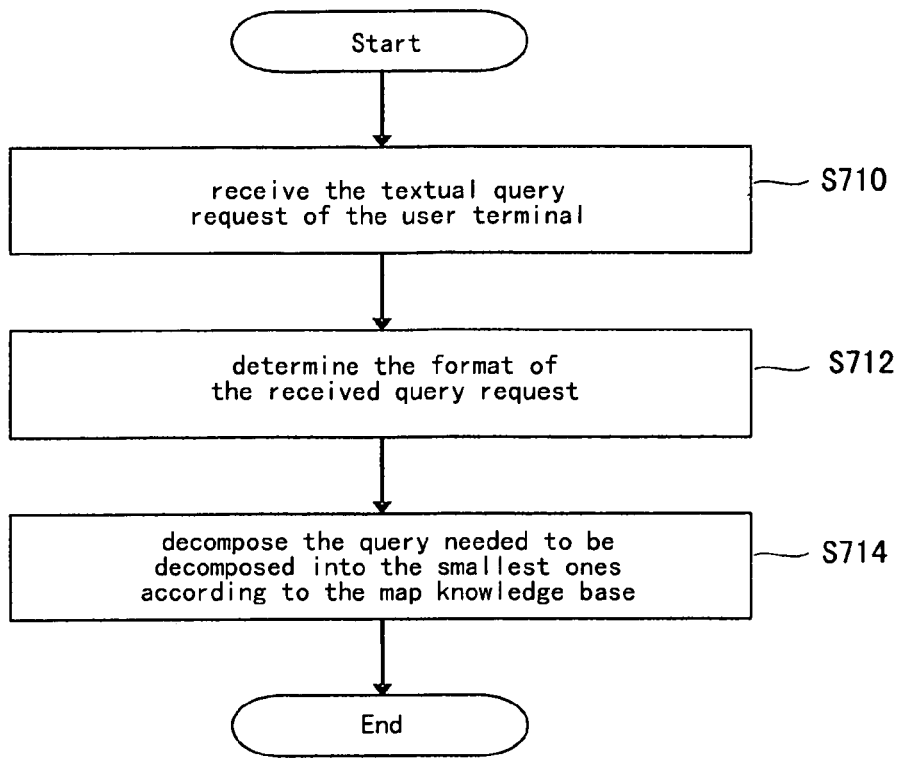
FIG. 7 shows a flow chart of analyzing a query request of a user.

Referring to FIG. 7, the receiving unit 201 of the traffic information query processing device 20 receives textual query request sent by the receiving user terminal 30 at S710, and sends the received query request to the analyzing unit 202. Generally, the users query requests include the following various textual query request formats:

"Where" (for example, "Xizhimen bridge?");
"Where, Direction" (for example, "Xizhimen bridge, North bound?");
"Where, Question" (for example, "the Guanyuan bridge, traffic jam?"),
"Where, Direction, Question" (for example, "the West second ring, North bound, traffic slow?"),
"Where, Time" (for example, "the Xizhimen bridge, 8:30?");
"Where, Direction, Time" (for example, "the Xizhimen bridge, North bound, 8:30?");
"Where, Question, Time" (for example, "the Guanyuan bridge, traffic jam, 8:30?"),
"Where, Direction, Question, Time" (for example, "the West second ring, North bound, traffic slow, 8:30?");
And "from where to where, direction, Question" (for example, "from the Xizhimen bridge to the new Fuchengmen bridge, north bound, traffic jam?").

Although taking those textual query request formats as examples to describe the processing of query request, this invention is not limited to the above textual query having the mentioned format.

The analyzing unit 202 analyzes the query request (for example, "the West second ring, North bound, traffic slow?") after receiving it.

First, the analyzing unit 202 determines the format of the received query request and judges whether the query request needs to be decomposed at S712. For a user query request "the West second ring, North bound, traffic slow?", the analyzing unit 202 determines that it belongs to the format "Where, Direction, Question", wherein "Where=the West second ring", "Direction=north bound" and "Question=traffic slow". Then the analyzing unit 202 identifies "Where" in the query request by matching with the attribute values such as "road name", "road segment", "bridge", "roadside landmark buildings" in the concept part in the map knowledge 105. The analyzing unit 202 identifies the "direction" in the query request by matching with the "direction" in the concept part in the map knowledge 105, and identifies the "Question" of the query request by matching with the traffic status description table shown in the FIG. 6b. Since "Where=the West second ring", the analyzing unit 202 determines that it should be decomposed according to the relation part in the map knowledge 105. If the use's query request is "Guanyuan bridge traffic jam?" the analyzing unit 202 determines that "Guanyuan bridge" needs not to be decomposed, Furthermore, when the determined query request is the "from where to where, direction, Question" format, the analyzing unit 202 will identify "from where" and "to where", then converts them to "Where". Then, the above-mentioned matching step is performed.

Figure 9A:
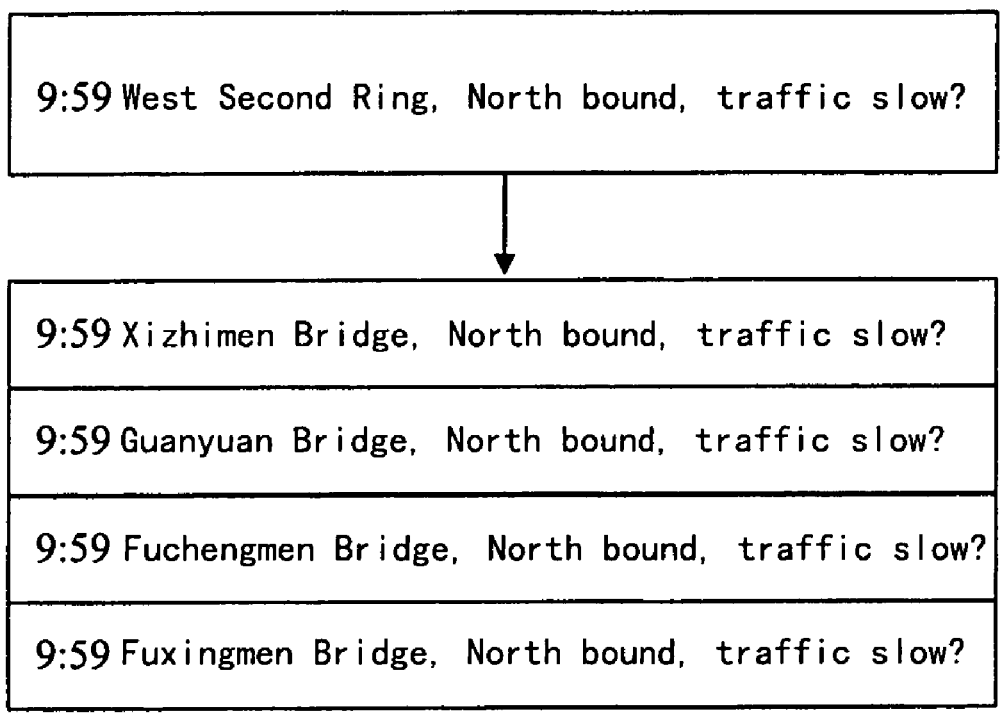
FIGS. 9a, 9b and 9C show a schematic block of analyzing query request of a user terminal and combining a query result.
Figure 9B:
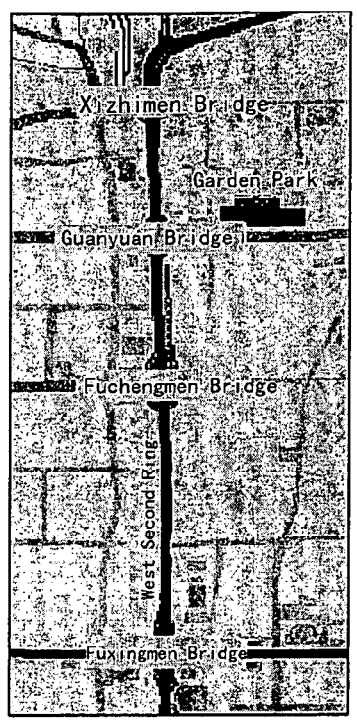

Then, at S714, the analyzing unit 202 decomposes the query request needed to be decomposed into the minimum query request according to the knowledge related to the attributes of roads and traffic points, the attribute values corresponding to the attributes and the spatial information among the attributes. The minimum query request means the received query request is decomposed into attribute values of roads and traffic points which can not be decomposed further. Referring to FIGS. 9a and 9b, for the "West second ring" in a query request, it can be deduced that "Xizhimen bridge", "Guanyuan bridge", "Fuchengmen bridge" and "Fuxingmen bridge" are points of "the West second ring" according to relation "point-of (the Xizhimen bridge, the Guanyuan bridge, the Fuchengmen bridge, the Fuxingmen bridge, the West second ring)" in relation part the map knowledge base 105.

Figure 8:
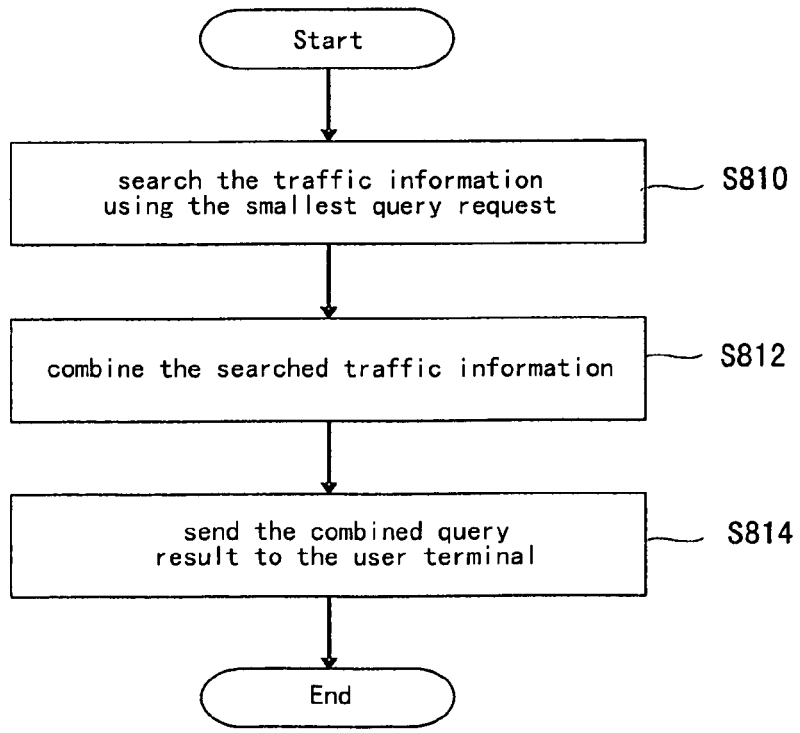
FIG. 8 shows a flow chart of performing the traffic information query and combining a query result.

All the query requests related to the West second ring is decomposed into "Xizhimen bridge", "Guanyuan bridge", "Fuchengmen bridge" and "Fuxingmen bridge" and they cannot be decomposed further. Referring to FIG. 8, the traffic information query unit 203 uses the minimum query request decomposed by the analyzing unit 202 to search the traffic information database 205 for traffic information at S810. It should be noted that the traffic information recorded in the traffic information database 205 corresponds to the decomposed minimum query request.

At S812, the query result combining unit 204 combines the similar traffic information by using the data items such as traffic points, the direction, the traffic status and time, on the basis of the searched initial query result from the traffic information database 205, so that the combined query request is formed. Therefore, there is no need to present to the user a lot of repeated or similar traffic information. For a user terminal having small screen, the user can conveniently and directly view all the required traffic information without scrolling over the screen, since the query result is combined. Specifically, the query result combined a great deal of traffic information includes two parts: a summary part and a detailed description part. The summary part is used to show the traffic status briefly and the detailed description is used to show the traffic status about the corresponding traffic point. Generally, a summary is obtained by the statistics of central traffic status in the query request. For example, when most of the query results "traffic status" are centralized to represent "slow", then the traffic status is determined to be slow. At S814, the traffic information database 205 sends the combined query request in at least one of textual format, image format and voice format.

If the analyzing unit 202 determines that the query request needs to be decomposed, the traffic information query unit 203 searches the traffic information database 205 according to the query request and the query result combining unit 204 combines the similar traffic information in the initial query result. Then the query result is sent to the user terminal 30 via the sending unit 206.

Figure 9C:
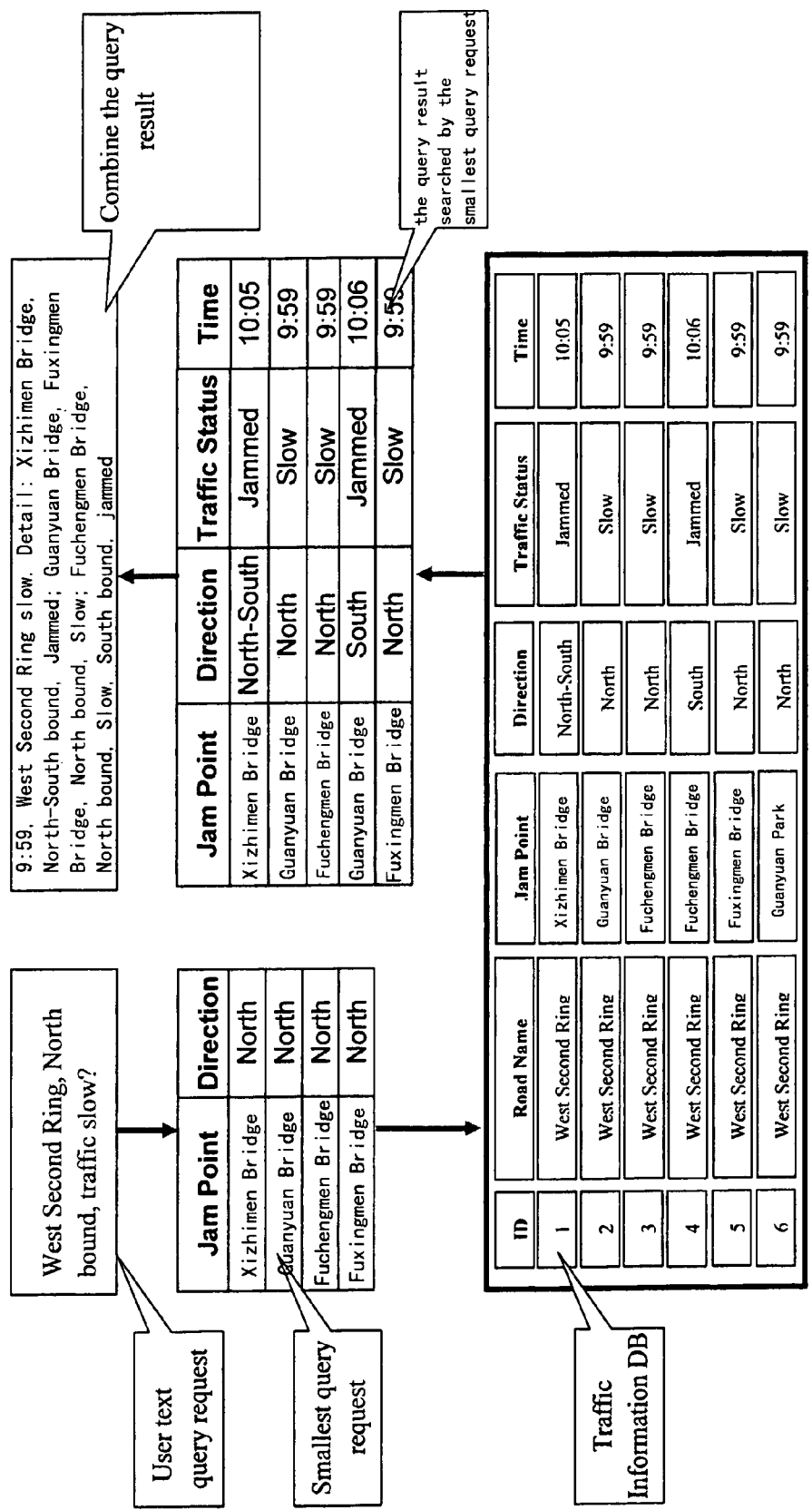

FIG. 9c shows an example of a traffic information query. From the FIG. 9c, the traffic information query system analyzes the query request input by the user terminal, and combines the searched initial query result. Therefore, the user only simply inputs the query request "West second ring, North bound, traffic slow?" to get the specific and accurate traffic information "9:59, West second ring traffic slow. Specifically, Xizhimen bridge, South bound, traffic jam; Guanyuan bridge, Fuxingmen bridge, North bound, traffic slow; Fuchengmen bridge, North bound, traffic slow, South bound, traffic slow".

Although this invention describes that the traffic query processing device 20 of the traffic information query system comprises a traffic information query unit 203 and a query result combining unit 204, it is obvious for those skilled in the art that the traffic query processing device 20 can also only comprises the traffic information query unit 203.

Figure 10:
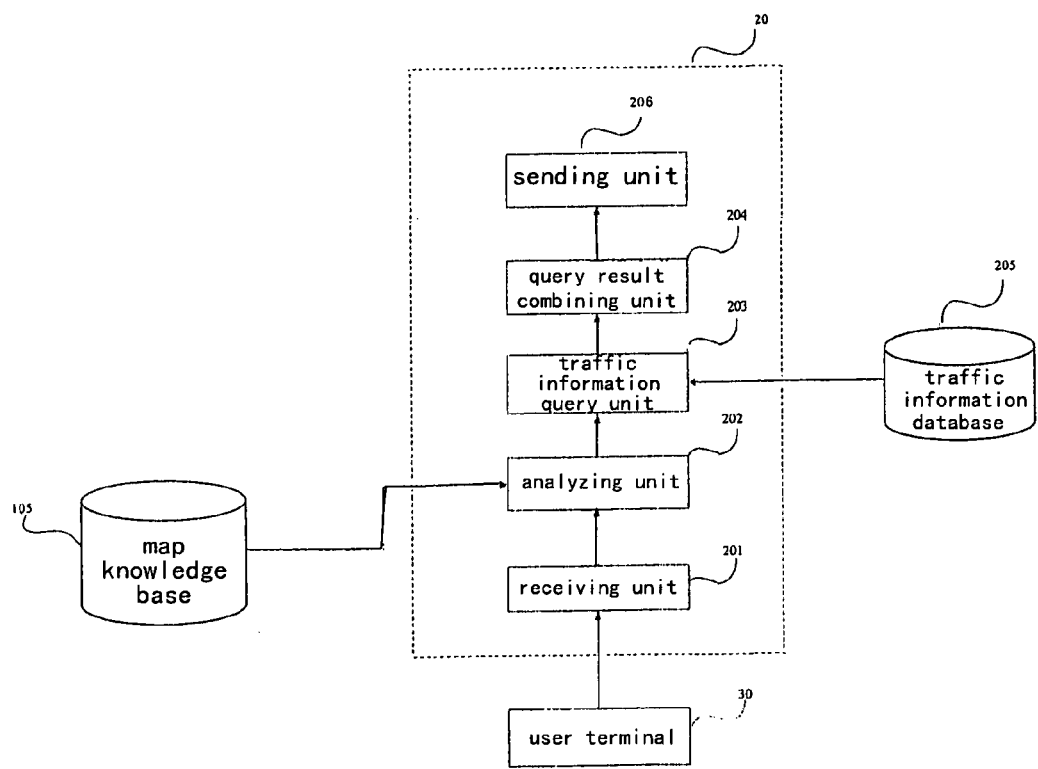
FIG. 10 shows a schematic block of a traffic information query device according to the invention.

FIG. 10 shows a schematic block of the traffic information query section according to this invention. The traffic information query device comprises the traffic information database 205, the traffic query processing device, the memory unit for storing the traffic status description table of the traffic status (not shown) and the map knowledge base 105.

Since the structure of the map knowledge base 105, the traffic information database 205 and the traffic query processing device 20 are identical with those in FIG. 5, here the description of them will be omitted. Moreover, the traffic information query section comprises the map knowledge base 105 and the traffic information database 205, the map knowledge base 105 and the traffic information database 205 can be arranged outside the traffic information query section.

By using the traffic information query system of the present invention, the user terminal implements an effect of querying the traffic information conveniently and in real time. Since the traffic information query system decomposes the query request of the user into the minimum query request according to the knowledge of the map knowledge base, the invention has the effective advantage of performing accurate query on the basis of understanding intention of the user's query request.

While specific embodiment and applications of the present invention have been illustrated and described, it should be understood that the invention is not limited to the precise configuration and components disclosed herein. Various modifications, changes, and variations which will be apparent to those skilled in the art may be made in the arrangement, operation, and details of the methods and system of the present invention disclosed herein without departing from the spirit and scope of the invention.

What is claimed is:

1. A map knowledge base generating section, comprising:
   an attribute value extracting unit for extracting attribute values corresponding to attributes of roads and traffic points from an electronic map;
   an attribute value spatial relationship forming unit for forming spatial correspondence relationship among the extracted attribute values of the roads and the traffic points; and
   a combining unit for combining the attributes of the roads and the traffic points corresponding to the attribute values, the spatial correspondence relationship among the attribute values, and an axiom based on the spatial correspondence relationship so as to form a map knowledge base.

2. A map knowledge base generating method, comprising:
   extracting attribute values corresponding to attributes of roads and traffic points from an electronic map;
   forming spatial correspondence relationship among the extracted attribute values of the roads and the traffic points; and
   combining the attributes of the roads and the traffic points corresponding to the attribute values, the spatial correspondence relationship among the attribute values, and an axiom based on the spatial correspondence relationship so as to form a map knowledge base.

3. A traffic information query system, comprising:
   a map knowledge base generating section for generating knowledge related to attributes of roads and traffic points, attribute values corresponding to the attributes, and spatial information of the attribute values based on an electronic map so as to form a map knowledge base; and
   a traffic query processing section for receiving and analyzing a query form a user terminal, decomposing the query if it is determined that the query can be decomposed according to the map knowledge base, and searching a traffic information database according to the decomposed query.

4. The traffic information query system according to claim 3, further comprising the traffic information database.

5. The traffic information query system according to claim 4, wherein the map knowledge base generating section comprises:
   an attribute value extracting unit for extracting the attribute values corresponding to the attributes of the roads and the traffic points from an electronic map;
   an attribute value spatial relationship forming unit for forming spatial correspondence relationship among the attribute values of the roads and the traffic points; and
   a combining unit for combining the attributes of the roads and the traffic points corresponding to the attribute values, the spatial correspondence relationship among the attribute values, and an axiom based on the spatial correspondence relationship so as to form the map knowledge base.

6. The traffic information query system according to claim 5, wherein the traffic query processing section comprises:
   a receiving unit for receiving the query from the user terminal as a first query;
   an analyzing unit for identifying a format of the first query, decomposing the first query into a second query which corresponds to the attribute values of the roads or the traffic points when the first query can be decomposed according to the map knowledge base;
   a query unit for searching the traffic information database for traffic information according to the first query or the second query and forming a query result, corresponding to the query, based on an initial query result; and
   a sending unit for sending the query result to the user terminal.

7. The traffic information query system according to claim 6, wherein the traffic query processing section further comprises:
   a query result combining unit for combining similar traffic information from the initial query result so as to form the query result.

8. The traffic information query system according to claim 7, wherein the combined result comprises a traffic information summary part and a detail description part.

9. The traffic information query system according to claim 6, wherein the analyzing unit identifies the format of the first query by determining whether or not the first query corresponds to one of the formats "where", "where, direction", "where, question", "where, direction, question", "where, time", "where, time question", "where, direction, time", "where, question, time" and "where, direction, time, question", and if not, then translating the first query into a format which corresponds to the one of the formats.

10. The traffic information query system according to claim 6, wherein the sending unit sends the query result in at least one of textual format, image format, and voice format.

11. The traffic information query system according to claim 3, wherein the user terminal is one of a wireless communication terminal and a wired communication terminal.

12. A traffic information query method, comprising:
    generating knowledge related to attributes of roads and traffic points, attribute values corresponding to the attributes, and spatial information of the attribute values based on an electronic map so as to form a map knowledge base; and
    receiving and analyzing a query from a user terminal, decomposing the query if it is determined that the query can be decomposed according to the map knowledge base.

13. The traffic information query method according to claim 12, wherein the map knowledge base generating step comprises:
    extracting the attribute values corresponding to the attributes of the roads and the traffic points from the electronic map;
    forming the spatial correspondence relationship among the attribute values of the roads and the traffic points; and
    combining the attributes of the roads and the traffic points corresponding to the attribute values, the spatial correspondence relationship among the attribute values, and an axiom based on the spatial correspondence relationship so as to form the map knowledge base.

14. The traffic information query method according to claim 13, wherein the traffic query processing step comprises:
    receiving the query from the user terminal as a first query;
    a format of the first query, decomposing the first query into a second query which corresponds to the attribute values of the roads or the traffic points when the first query can be decomposed according to the map knowledge base;
    searching a traffic information database for traffic information according to the first query or the second query and forming a query result, corresponding to the query, based on an initial query result; and
    sending the query result to the user terminal.

15. The traffic information query method according to claim 14, wherein the traffic query processing step further comprises combining similar traffic information from the initial query result so as to form the query result.

16. The traffic information query method according to claim 15, wherein the query result comprises a traffic information summary part and a detail description part.

17. The traffic information query method according to claim 14, wherein the analyzing step identifies the format of the first query by determining whether or not the first query corresponds to one of the formats "where", "where, direction", "where, question", "where, direction, question", "where, time", "where, time question", "where, direction, time", "where, question, time" and "where, direction, time, question", and if not, then translating the first query into a format which corresponds to the one of the formats.

18. The traffic information query method according to claim 14, wherein the sending step sends the queried result in at least one of textual format, image format, and voice format.

19. The traffic information query method according to claim 12, wherein the user terminal is one of a wireless communication terminal and a wired communication terminal.

20. A traffic information query device, comprising:
a receiving section for receiving a query from a user terminal as a first query;
an analyzing section for identifying a format of the first query, said analyzing section decomposing the first query into a second query which corresponds to attribute values of roads or traffic points when the analyzing section determines the first query can be decomposed according to a map knowledge base including knowledge related to attributes of the roads and the traffic points, the attribute values corresponding to the attributes, and spatial information among the attribute values based on an electronic map;
a query section for searching a traffic information database for traffic information according to the first query or the second query and forming a query result; and
a sending section for sending the query result to the user terminal.

21. The traffic information query device according to claim 20, further comprising at least one of the map knowledge base and the traffic information database.

22. The traffic information query device according to claim 21, further comprising: a queried result combining unit for combining similar traffic information from initial query result so as to form the query result.

23. The traffic Information query device according to claim 22, wherein the combined result comprises a traffic information summary part and a detail description part.

24. The traffic information query device according to claim 20, wherein the analyzing section identifies the format of the first query by determining whether or not the first query corresponds to one of the formats "where", "where, direction", "where, question", "where, direction, question", "where, time", "where, time, question", "where, direction, time", "where, question, time" and "where, direction, time, question", and if not, then translating the first query into a format which corresponds to the one of the formats.

25. The traffic information query device according to claim 20, wherein the sending section sends the query result in at least one of textual format, image format, and voice format.

26. The traffic information query device according to claim 20, wherein the user terminal is one of a wireless communication terminal and a wired communication terminal.

27. A traffic information query method, comprising:
receiving a query from a user terminal as a first query;
identifying a format of the first query, decomposing the first query into a second query which corresponds to attribute values of roads or traffic points when the first query can be decomposed according to a map knowledge base, wherein the map knowledge base comprises information related to attributes of the roads and the traffic points, the attribute values corresponding to the attributes, and spatial information of the attribute values based on an electronic map;
searching a traffic information database for traffic information according to the first query or the second query and forming a query result; and
sending the query result to the user terminal.

28. The traffic information query method according to claim 27, further comprising:
combining similar traffic information from an initial query result so as to form the query result.

29. The traffic information query method according to claim 28, wherein the query result comprises a traffic information summary part and a detail description part.

30. The traffic information query method according to claim 27, wherein the analyzing step identifies the format of the first query by determining whether or not the first query corresponds to one of the formats "where", "where, direction", "where, question", "where, direction, question", "where, time", "where, time question", "where, direction, time", "where, question, time" and "where, direction, time, question", and if not, then translating the first query into a format which corresponds to the one of the formats.

31. The traffic information query method according to claim 27, wherein the sending step sends the query result in at least one of textual format, image format, and voice format.

32. The traffic information query method according to claim 27, wherein the user terminal is one of a wireless communication terminal and a wired communication terminal.

* * * * *

UNITED STATES PATENT AND TRADEMARK OFFICE
CERTIFICATE OF CORRECTION

PATENT NO. : 7,908,075 B2  
APPLICATION NO. : 11/598725  
DATED : March 15, 2011  
INVENTOR(S) : Hongwei Qi et al.

Page 1 of 1

It is certified that error appears in the above-identified patent and that said Letters Patent is hereby corrected as shown below:

In the Specifications:

Column 1, Line 19: delete "mad" and insert -- road --

Column 6, Line 22: delete "mad" and insert -- road --

In the Claims:

Column 10, Line 23: In Claim 9, delete "time question" and insert -- time, question --

Column 10, Line 59: In Claim 14, before "a" insert -- identifying --

Column 11, Line 13: In Claim 17, delete "time question" and insert -- time, question --

Column 12, Line 27: In Claim 27, delete "fonning" and insert -- forming --

Column 12, Line 41: In Claim 30, delete "time question" and insert -- time, question --

Signed and Sealed this  
Twenty-third Day of July, 2013

Teresa Stanek Rea  
*Acting Director of the United States Patent and Trademark Office*